(12) United States Patent
Doering et al.

(10) Patent No.: US 7,406,363 B2
(45) Date of Patent: Jul. 29, 2008

(54) IRRIGATION CONTROLLER WITH INTEGRATED VALVE LOCATOR

(75) Inventors: Steven Doering, Wills Point, TX (US); Joseph R. Esposito, Carrollton, TX (US); William F. Cain, North Richland Hills, TX (US)

(73) Assignee: Telsco Industries, Inc., Garland, TX (US)

( * ) Notice: Subject to any disclaimer, the term of this patent is extended or adjusted under 35 U.S.C. 154(b) by 513 days.

(21) Appl. No.: 11/202,442

(22) Filed: Aug. 12, 2005

(65) Prior Publication Data
US 2007/0035907 A1 Feb. 15, 2007

(51) Int. Cl.
*G05D 11/00* (2006.01)
(52) U.S. Cl. ...................... 700/284; 700/282
(58) Field of Classification Search ......... 700/282–284; 239/67, 69; 137/78.2; 335/104
See application file for complete search history.

(56) References Cited

U.S. PATENT DOCUMENTS

| | | | |
|---|---|---|---|
| 4,165,532 A * | 8/1979 | Kendall et al. | ............... 700/284 |
| 5,251,153 A | 10/1993 | Nielson et al. | |
| 5,632,465 A * | 5/1997 | Cordua | ........................ 251/46 |
| 6,314,340 B1 | 11/2001 | Mecham et al. | |
| 6,993,416 B2 * | 1/2006 | Christiansen | ................ 700/284 |
| 7,113,124 B2 * | 9/2006 | Waite | ........................... 342/22 |

OTHER PUBLICATIONS

Chatterbox—R Co. Parts—http://thesource-online.com/chatterbox_instructions.pdf.*
The Krik-It—http://members.cox.net/tismaz/billtism.htm.*
Buzz-Bee—Reed's Irrigation Service—http://www.reedsirrigation.com/buzzbee.htm.*
*Electrical Standards For Digital Command Control, All Scales*, S-9.1 Electrical Standards for DCC, Printed Jul. 2004, National Model Railroad Association, Inc.

* cited by examiner

*Primary Examiner*—Alexander J Kosowski
(74) *Attorney, Agent, or Firm*—Rudolph J. Buchel, Jr.

(57) ABSTRACT

The present invention is directed to an irrigation controller, method and software program product for generating valve control signals for energizing a valve. The irrigation controller includes a valve actuation control module selectively coupled each of plurality of control nodes and generating a valve actuation control signal thereon. The valve actuation control signal is a continuous control voltage over a plurality of control signal periods for selectively energizing the selected irrigation valve. Also integrated in the irrigation is a valve chatter module for selectively coupled each of plurality of control nodes and generating a valve chatter control signal thereon. The valve chatter module selectively and, intermittently, energizes the selected irrigation valve. The irrigation controller may further include a remote controller of remotely controlling the irrigation controller.

35 Claims, 6 Drawing Sheets

FIG. 10B

IRRIGATION CONTROLLER WITH INTEGRATED VALVE LOCATOR

BACKGROUND OF THE INVENTION

1. Field of the Invention

The present invention relates to an irrigation controller. More particularly, the present invention relates to an irrigation controller with a solenoid activator for rapidly pulsing the solenoid actuator.

2. Description of Related Art

Conventional automated irrigation systems generally comprise two coextensive physical networks that work in concert for the delivery of water. The first is a water delivery network consisting of a water delivery conduit, (e.g., pipe and/or tubing), metering, regulating and dispersing elements for efficiently regulating the flow of water through the conduit and dispersing water over a predetermined area. These elements may include pumps, boosters, irrigation control valves (such as the Weathermatic® Nitro line of diaphragm actuated valves available from Telsco Industries, Incorporated, in Dallas, Tex.) anti-siphon devices, check valves, and various types of water dispersion elements (such as sprinklers, either spray, rotary, drip, bubblers, soaker or misters) for wetting the foliage or surface area with water. At least the conduit, irrigation control valves and certain water dispersion elements are installed below ground, or at least below grade. A conventional irrigation system is divided into discrete irrigation zones (sometimes referred to as stations) and the water flow to each zone is controlled and/or regulated by an irrigation control valve. Each irrigation zone is defined by a plurality of water dispersion elements, each controlled by a separate irrigation control valve, which is coupled in the conduit between the water source and the plurality of water dispersion elements. The conduit and water dispersion elements are installed directly in the ground, but irrigation control valves are protected from the soil by a valve box and cover.

The second network is an electrical control network. The purpose of the electrical control network is to generate control signals and transmit the signals to certain components in the water delivery network. Typically, the electrical control network comprises an irrigation controller for generating the control signals (such as the SmartLine™, Weathermatic® Lawnmate or WeatherMate™ controllers, all available from Telsco Industries, Incorporated), and a transmission medium for propagating the signals to the electrical components in the irrigation system.

Periodically, it may be necessary for a grounds keeper or operator to gain access to an irrigation control valve to, for example, adjust the amount of water allowed to flow into a particular irrigation zone, or perform preventive maintenance on the irrigation control valve. Often, however, the cover of the valve box will become obscured with dirt, compost, mulch, or some other obstruction, or by vegetation which has been purposely been allowed to conceal the cover. An operator will then probe the ground with a sharpened metal probe around the presumed location in an attempt to find the cover. When the operator receives an indication of an object hidden below the surface, i.e., the probe makes contact with an object below the surface of the ground, the operator excavates the top soil, turf and/or shrubbery to identify the obstructing object. This method of probing and digging is an extremely time consuming process and may involve many hours of probing and digging to locate a particular valve.

Often, during the installation of an irrigation system, the installers will create a surface map of the irrigation system. The map shows the layout of the pipes, sprinklers and valves for each irrigation zone, with reference to fixed objects and the topography of the landscape. The operator may then update the irrigation map to incorporate the locations of plants, shrubs, trees and other foliage. With such a map, the operator will have a good approximation of the location for each valve in the system; from which the operator may begin a search for a particular valve; thereby shortening the operator's searching time.

BRIEF SUMMARY OF THE INVENTION

The present invention is directed to an irrigation controller, method and software product for energizing an irrigation valve. The irrigation controller includes at least one control node coupled to an irrigation valve through a control wire, valve actuation control circuitry electrically coupled to the control node for generating a valve actuation control signal on the control node over an actuation period, wherein the valve actuation control signal comprising a plurality of control signal periods each having a continuous control voltage, whereby the valve actuation control signal continuously energizes the control node and a valve over the actuation period, and valve chatter circuitry electrically coupled to the control node for generating a valve chatter control signal on the control node, wherein the valve chatter control signal comprising a plurality of duty cycles, each duty cycle comprising one control signal period and at least one naught signal period, the control signal period comprising a control voltage over a first portion of the control signal period and a naught voltage over a second portion of the control signal period, and the at least one naught signal period comprising a naught voltage, whereby the valve chatter control signal intermittently energizes the control node and the valve over the chatter period.

Alternatively, the irrigation controller comprises a control node, a memory for storing processor usable program code for generating a valve control signal for energizing the control node and a processing unit connected to the memory and receptive of the program code, wherein the program code for generating a valve control signal, when executed by the processing unit, causes the irrigation controller to generate a valve actuation control signal on the control node for controlling a continuous control voltage to a valve over an actuation period, and to generate a valve chatter control signal on the control node for a controlling an intermittent chatter voltage to the valve over a chatter period, wherein the intermittent chatter voltage comprises a plurality of duty cycles and each duty cycle comprises one signal voltage period and at least one naught voltage period, the signal voltage period comprises a first voltage level over a first portion of the signal voltage period and a second voltage level over a second portion of the signal voltage period, and the at least one naught voltage period comprises a second voltage level, wherein the second voltage level is less than the first voltage level.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

Other features of the present invention will be apparent from the accompanying drawings and from the following detailed description.

DETAILED DESCRIPTION OF THE INVENTION

Figure 1:
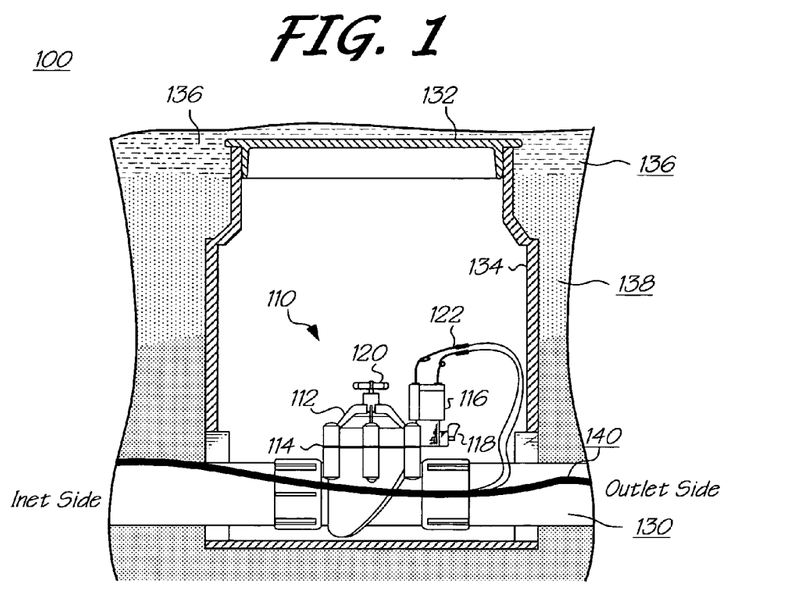
FIG. 1 is a cross-sectional diagram of a typical subterranean installation of a typical irrigation control valve as installed in an irrigation zone.

An electromechanical irrigation control valve is typically employed to regulate the flow of water between an inlet water source and outlet dispersion elements, such as sprinklers, located in a particular irrigation zone or station. FIG. 1 is a cross-sectional diagram of a typical subterranean installation of a typical irrigation control valve for a particular irrigation zone. During installation, a trench is dug in soil 138, in which irrigation pipe 130 and direct burial control wire 140 are laid. Irrigation pipe 130 is typically PVC (polyvinylchloride) in sizes ranging from 0.5 inch to 2.0 inches or more for certain commercial installations. Direct burial control wire 140 is a multi-conductor cable incased in a tough, non-reactive jacket (such as polyethylene, PVC or Neoprene®). Typically, control wire 140 contains an odd number of conductors (12-16 American Wire Gauge (AWG) diameter), one common conductor wire and an even number of insulated station conductors. Optionally, control wire 140 may also contain a serial communication bus for connecting electronic components in the irrigation system. Irrigation control valve 110 connects an irrigation zone to an inlet pipe. As depicted, irrigation control valve 110 is an inline valve, but other types of automated control vales are available, such as anti-siphoning control valves. The valve, wiring, pipes and connections are all protected from the soil by open-ended valve box 134 and removable cover 132, which surround the valve and allow for easy access to the valve assembly by an operator or service technician. Often, a single valve box will house 2, 4 or even 6 individual irrigation control valves each coupled to an inlet manifold.

Figure 2:
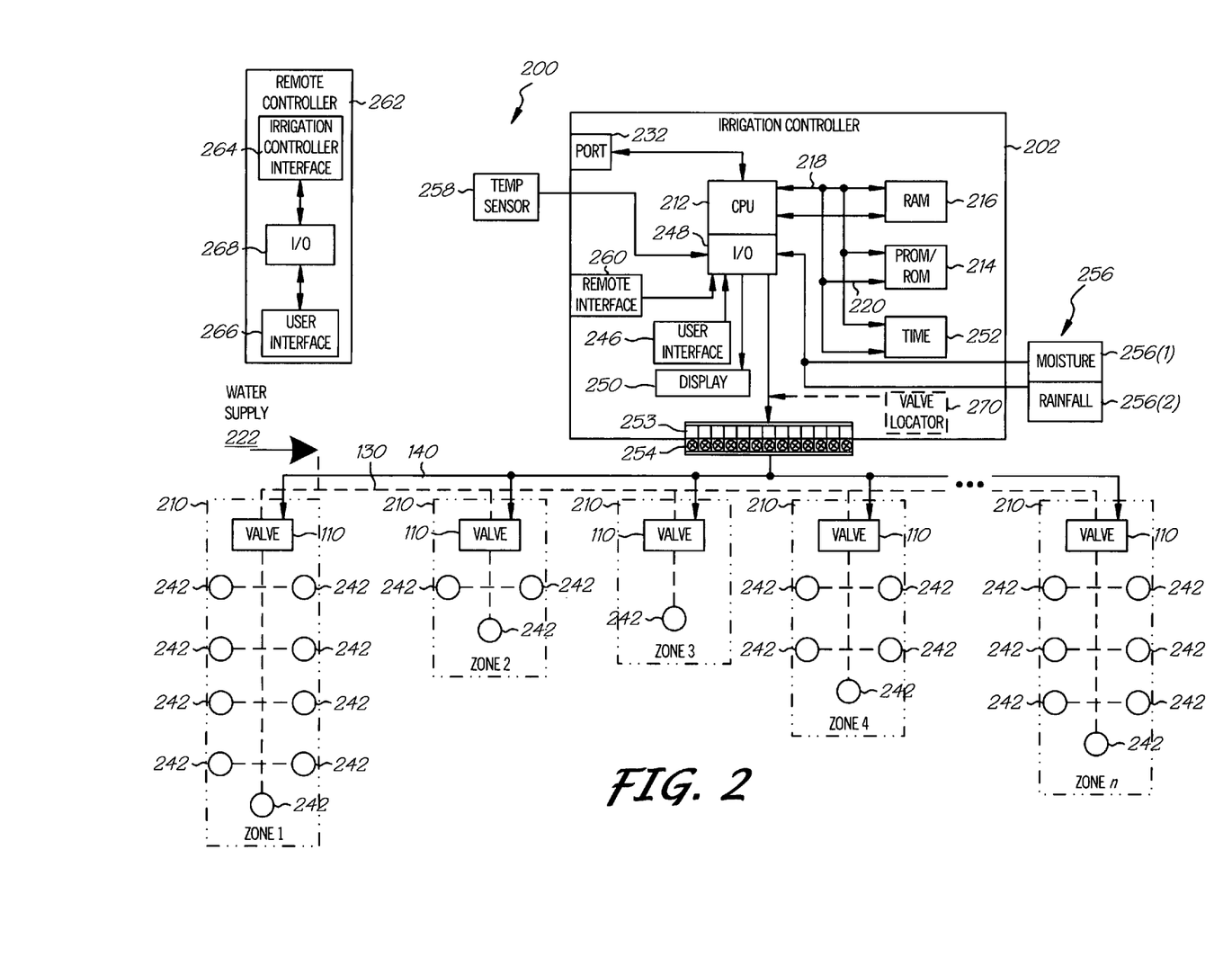
FIG. 2 is a block diagram of an irrigation system depicting the layout topology of the coextensive water and electrical control networks, including an irrigation controller, in accordance with an exemplary embodiment of the present invention.

Each valve in an irrigation system controls and/or regulates water to a particular irrigation zone that is proximate to the valve, which may be more clearly understood from the irrigation topology depicted in FIG. 2. FIG. 2 is a block diagram illustrating an irrigation system in accordance with an exemplary embodiment of the present invention. Each of valves 110 is connected between the water delivery network and the electrical control network. Water supply 222 produces pressurized water that is fed into pipes 130, which are connected through valves 110, and onto water dispersion elements (sprinklers) 242. Each set of irrigation control valve 110 and associated water dispersion elements (sprinklers) 242 defines a particular irrigation zone 210 (such as irrigation zones 1, 2, 3, . . . n). Valves 110 receive a control signal from irrigation controller 202, via control wire 140. In many applications, the signal received by valves 110 is a change in voltage level (or more correctly, a change in the current resulting from a voltage change applied across the control wires). This control signal is generated by irrigation controller 202. A single irrigation controller can control 6, 12, 25 or 46 irrigation zones or more. Irrigation controllers, and the operation of which, may be generally understood from the disclosure of U.S. Pat. No. 6,314,340, issued to Mecham, et al., on Nov. 6, 2001, which is incorporated herein by reference in its entirety.

With further reference to FIG. 2, a block diagram of irrigation controller 202 is depicted in accordance with an exemplary embodiment of the present invention. Irrigation system 200 comprises at least irrigation controller 202 and optionally, may further comprise other control components such as one or more evapotranspiration module (not shown) and/or remote controller 262. Some aspects of irrigation controller 202 function generally in the same manner as a conventional irrigation controller. In this regard, an irrigation schedule is programmed into irrigation controller 202 by an operator which specifies not only the day and time of day when irrigation should occur, but also the run time for irrigation in each zone (or program). Irrigation controller 202 then operates to keep track of the irrigation schedule and control the actuation of irrigation control valves 110 in accordance with that schedule for the operator specified run time.

An irrigation schedule is programmed into the irrigation controller 202 by the operator which specifies the day and time of day when irrigation should occur. In one implementation, the operator need not pre-program any run time, and the controller chooses an appropriate run time. In another implementation, an operator selected run time is modified by the controller calculated run time if the operator makes this selection. As depicted, irrigation controller 202 operates to process temperature data at the site and calculate a reference evapotranspiration value representing the amount of water lost since a last irrigation. When evapotranspiration modules are in place, a separate temperature sensor is connect to each evapotranspiration module which then calculates a separate reference evapotranspiration value at those remote sites. This information is then communicated to irrigation controller 202. In response to receipt of the evapotranspiration information, irrigation controller 202 calculates a run time for each zone 210 (or program), and then operates to control the actuation of irrigation control valves 110 in accordance with the irrigation schedule and for the duration of the calculated run time.

Irrigation controller 202 includes microprocessor (Main CPU) 212, programmable read only memory (ROM/PROM) 214 and random access memory (RAM) 216. ROM/PROM 214 provides a non-volatile storage location for the programming code of the irrigation controller along with certain important (permanent) data necessary for execution of the code. RAM 216 provides a volatile storage location for certain (variable/temporary) data generated during execution of the programming code. Microprocessor 212 communicates with ROM/PROM 214 and RAM 216 in a conventional manner utilizing address bus 218 and data bus 220. It will be understood that ROM/PROM 214 and RAM 216 may be incorporated within or provided separate and apart from microprocessor 212.

The evapotranspiration module also includes a microprocessor connected to a programmable read only memory (ROM/PROM) and a random access memory (RAM), and functions in a similar manner to the irrigation controller. The ROM/PROM provides a non-volatile storage location for the programming code of the watering time determination module along with certain important (permanent) data necessary for execution of the code. The RAM provides a volatile storage location for certain (variable/temporary) data generated during execution of the programming code, wherein the microprocessor communicates with the ROM/PROM and RAM utilizing an address bus and a data bus.

Communication between wired external devices is achieved using serial communications port 232, which is connected to (or is incorporated in) the microprocessor 212 to support communications between the irrigation controller 202 and external devices such as an evapotranspiration module(s), a portable flash memory drive (not shown), or a personal/laptop computer (not shown). Similarly, a second communications port is connected to (or is incorporated in) any external device or module to be connected to irrigation controller 202.

User interface 246 for supporting data entry into controller 202 is connected to microprocessor 212 through I/O interface 248. Input data may, if necessary, be stored in RAM 216. Furthermore, using a serial communications link (not shown), user interface 246 input data may be communicated to an evapotranspiration module (also not shown) for storage in its onboard RAM. The kinds of data input into irrigation controller 202, and perhaps communicated to the evapotranspiration module include: a preferred time of day when irrigation (if necessary) is to be effectuated; a preferred day (or days) of the week when irrigation (if necessary) is to be effectuated; an identification of soil type for the irrigated area; an identification of the vegetation type (crop coefficient); irrigation system 200 site latitude; sprinkler flow rates; and, a local irrigation adjustment factor. User interface 246 may further be utilized to initiate certain microprocessor 212 and controller 202 activities (such as, for example, manual zone selection and/or irrigation, a self test, or the like) without regard to the current state of programming code execution.

Optionally, remote controller 262 may be used by the operator for communications with controller 202 from a remote location. Communication between remote controller 262 and irrigation controller 202 is accomplished using over-the-air RF (radio frequency) signals generated in remote interface 260 that are received by irrigation controller interface 264 (for unidirectional communication). It is anticipated that remote controller 262 will operate as an auxiliary external device and not as a substitute for user interface 246 on irrigation controller 202. Therefore, only uni-directional transmission to irrigation controller 202 is expected, although bidirectional communication may also be supported in both remote interface 260 and irrigation controller interface 264.

Display 250 (such as an LCD display) for supporting visual data presentation by irrigation controller 202 is also connected through I/O interface 248 to microprocessor 212. Through display 250, irrigation controller 202 may present information to the operator (such as time, day and date information). Display 250 may further be utilized by microprocessor 212 to present a variety of menus for operator consideration when entering data into irrigation controller 202 and evapotranspiration module, or inform the operator concerning the errors, status or the state of controller operation.

A time of day clock 252 is connected to microprocessor 212 through address bus 218 and data bus 220. This clock 252 maintains a non-volatile record of month, day, hour of the day, minutes of the hour and seconds of the minute. Clock 252 time data is monitored by microprocessor 212 with the time data driving certain operations by irrigation controller 202 and an evapotranspiration module in accordance with their programming codes. These operations include: reading and storing temperature data; initiating and stopping irrigation activities; and, performing certain irrigation related calculations.

In accordance with the execution of the programming code, microprocessor 212 outputs irrigation control signals through I/O interface 248 to control the actuation of irrigation control valves 110. These control valves 110 operate to either allow or block the passage of water to one or more water dispersion elements 242. Typically, the control signals to valves 110 are generated directly from the input power signal by transforming the high voltage line input to a lower voltage control signal. Controller 202 receives input line power (typically from 110 VAC or 220 VAC power at 50 or 60 Hz and having a generally sinusoidal character wave). The high voltage AC is typically transformed to a 24 VAC, approximately, continuous full-wave transformed from the line power. Solenoid activation is accomplished by supplying the control wires 140 with the 24 VAC, through a switching device, typically a triac, relay, or mechanical cam-operated switch contacts in irrigation controller 202.

Irrigation controller 202 optionally receives input from other sensors 256 through I/O interface 248. An example of such a sensor is moisture sensor 256 (1). When the moisture sensor 256 (1) detects moisture, this is indicative of a rainfall event. During such a rainfall event, microprocessor 212 suppresses irrigation controller 202 actuation to sprinkle. Another example of such a sensor comprises rainfall gauge 256 (2). Using rainfall information collected by rainfall gauge sensor 256 (2), microprocessor 212 adjusts (i.e., reduces or suppresses) its programming code calculated irrigation amount of water which is needed to replace water lost through the effects of evapotranspiration. Temperature sensor 258 is further provided and is connected to microprocessor 212 through input/output (I/O) interface 248. In accordance with the operation of the programming code, temperature data collected by sensor 258 is stored by microprocessor 212 in RAM 216. Alternatively, temperature sensor may be coupled to each evapotranspiration module connected to irrigation controller 202.

With further reference to FIG. 1, irrigation control valve 110 is comprised of three basic parts, body 112, diaphragm 114 and solenoid actuator 116. Operationally, typically valve 110 is of a normally-closed type that prevents the flow of water between the inlet side and outlet side whenever water pressure is present on the inlet side. A port in the valve allows water from the inlet side into a pressure chamber above diaphragm 114 (not shown). The water pressure forces the body of diaphragm 114 downward, securing it against a diaphragm seat and preventing water flow through the valve. The water flow can be switched on by reducing the water pressure above diaphragm 114, thereby allowing the water pressure from the inlet to push diaphragm 114 away from the diaphragm seat and open a water path through the valve. This may be accomplished in one of two ways. First, water pressure in the pressure chamber can be relieved by manually opening relief screw 118. This requires an operator to physically open relief screw 118 for water flow and then close the screw to stop the flow. Alternatively, pressure can be drawn off of the upper pressure chamber, remotely, by energizing solenoid actuator 116. With either action, a pathway is opened allowing the water trapped in the pressure chamber above diaphragm 114 to bleed into the outlet portion of pipe 130 (discussed further below with regard to FIGS. 8A and 8B), thereby relieving the pressure above diaphragm 114. In response to the pressure drop, the pressure of the inlet water forces diaphragm 114 away from the seal and against a stop in the upper portion of the pressure chamber. The position of the stop determines the opening size between diaphragm 114 and the valve seat, and hence the water flow rate through the valve. The position of the stop, and hence the open position of diaphragm 114, can be adjusted by turning flow control knob 120. If more or less water is desired for a particular irrigation zone, the operator merely opens cover 132, exposing valve 110 and knob 120, and then adjusts the position of the stop with knob 120, in the amount necessary to change the flow rate to the desired amount.

Figure 8A:
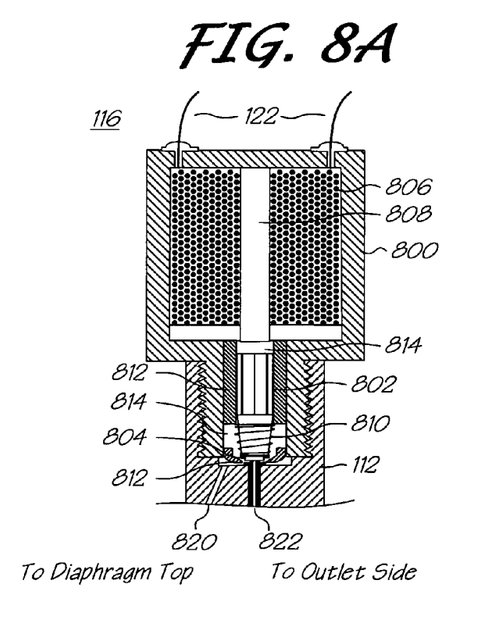
FIGS. 8A and 8B are cross sectional diagrams of a solenoid actuator cooperating with an irrigation control valve, depicted in the solenoid actuator in the unenergized and energized states.
Figure 8B:
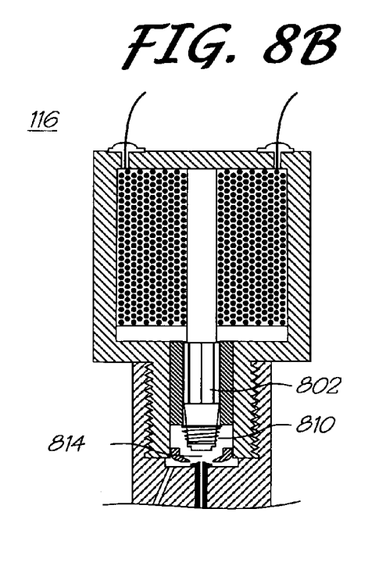

FIGS. 8A and 8B are cross sectional diagrams of solenoid actuator 116, shown as seated in valve body 112, depicted a solenoid actuator in the unenergized and energized states, respectively. Solenoid actuator 116 generally comprises housing 800, which encases core 808 and coil 806 in a waterproof compartment. Coil 806 is electrically coupled to control wires 140 through wire leads 122. Below core 808 is cylindrical wear guide 812 surrounding a movable piston 802. The cross-sectional shape of piston 802 is typically hexagonal, thereby allowing the piston to move freely along the interior surface of wear guide 812 and which provides a path for water displacement during piston movement. Seat 804 is affixed to the lower extent of piston 802. Spring 810 exerts a downward bias on piston 802 (away from coil 806 and core 808 and toward exit opening 822), with both spring 810 and piston 802 being secured in housing 800 by retainer 812. Water freely flows into cavity 814 through opening 820, surrounding piston 802 and spring 810, but is prevented from contacting coil 806.

As can be seen in FIG. 8A, in the unenergized position, piston 802 is in the closed position with seat 804 forced against exit opening 822 by the biasing force of spring 810. The force of spring 810, although relatively weak, is sufficient to provide a watertight seal over exit opening 822. By sealing opening 822, the water is prevented from flowing from the pressure chamber above the diaphragm through opening 820 and into outlet opening 822, thereby maintaining sufficient pressure in the chamber above the diaphragm to keep the diaphragm in the closed/sealed position, which prevents water from flowing through the valve.

As can be further understood from FIG. 8B, when energized core 808 becomes a powerful magnet that attracts piston 802. Piston 802 moves to the open position against core 808, and seat 804 is forced away from the normally closed position against exit opening 822. The magnetic force exerted on piston 802 by energizing coil 806 is many times greater than the downward biasing force of spring 810 on the piston. In response to the magnet force on piston 802, and immediately after activation, piston 802 is driven into core 808 with a clearly audible "clicking" (or chirping) sound. Water is then allowed to flow through cavity 814 from the pressure chamber above the diaphragm, through opening 820, into and egresses through opening 822.

Figure 3:
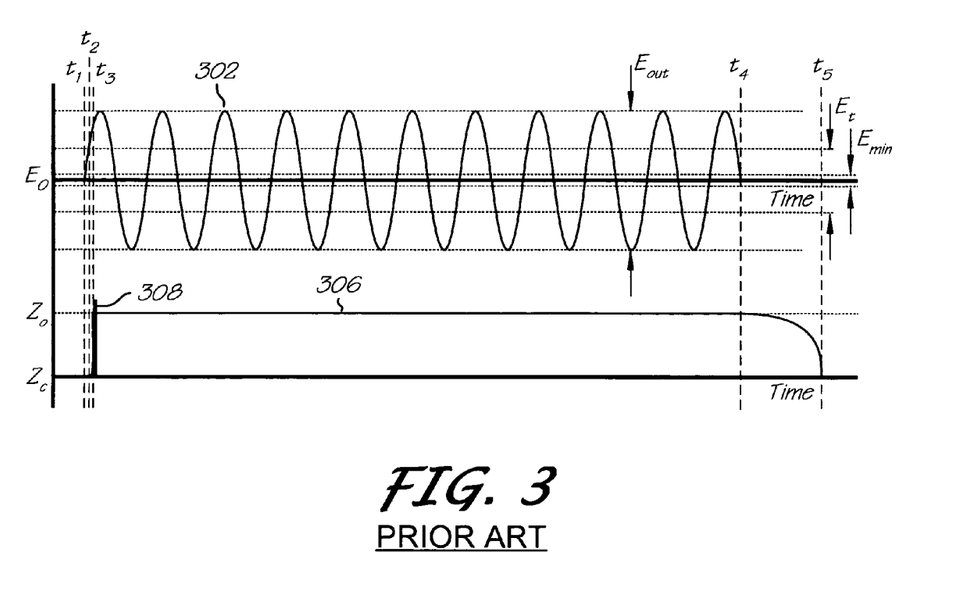
FIG. 3 is a timing diagram depicting a control signal generated by an irrigation controller and the relative position of a solenoid piston or piston movement in response to the control signal.

The electro-mechanical interactions between the components of solenoid actuator 116 can be better understood with respect to the timing diagrams depicted in FIG. 3. FIG. 3 depicts control signal trace 302, which varies between $E_0$ and $E_{out}$. The relative position of piston 802, position trace 306, varies between $Z_c$ and $Z_0$, and is responsive to changes in control signal 302. $E_0$ represents the unenergized state and $E_{out}$ represents the energized state during activation, and similarly, $Z_c$ represents the closed position of piston 802 (with seat 804 against exit opening 822), and $Z_0$ represents the full open position of piston 802 (with piston 802 against core 808). At normal state, with the irrigation valve closed, the control signal 302 to each control wire is 0.0 volts, or at $E_0$, as controller 202 is not generating an activation signal. At activation, controller 202 generates a control signal, or activation voltage, as an AC signal, $E_{out}$ (typically between 12.0 VAC and 26.0 VAC at 500 mA to 1.5 A), for actuating solenoid actuator 116. (see trace 302). As a practical matter, only a threshold energy of $E_t$ of approximately 5.0 VAC (less than 200 mA) is needed to create a sufficiently strong magnetic force in coil 806 to overcome the mechanical force of spring 810 and compresses the spring. As might be expected, much more voltage is necessary for changing the position of piston 802 (from the rest position against exit opening 822 to the upward most position against core 808), than is necessary to maintain piston 802 in the upward most position against core 808. Furthermore, because the magnetic force exerted on piston 802 by coil 806 is much greater than the biasing force of spring 810, piston 802 is far more responsive to open control signals than to close signals (i.e., it accelerates faster in response to the magnet than to the spring), as is apparent by comparing the time interval for piston 802 to open (between $t_1$ and $t_3$ on trace 306) with time interval to close (between $t_4$ and $t_5$ on trace 306). With piston 802 in contact with, or near core 808, only a minimal energy $E_m$ is necessary to keep spring 810 in compression (approximately 1.2 VAC at 85 mA or less). Thus, as can be seen from trace 306, piston 802 will not begin its downward movement until the voltage at coil 806 drops below $E_m$ (time $t_4$ on trace 306). The minimal energy $E_m$, necessary for counteracting the spring tension varies from valve to valve and depends on a number of factors, including the electromotive efficiency of coil 806, the compressive strength of spring 810 and the frictional resistance of wear guide 812 to piston 802. Furthermore, as the valve ages, the value for $E_m$ decreases due to spring 810 losing some of its resiliency and also due to an increase in the frictional resistance of wear guide 812 to piston 802 (the increase in the resistance is from dissolved minerals (calcium and magnesium hardness minerals) plating off onto the inner surface of wear guide 812 and the outer surface of piston 802). Any condition that resists the force of spring 810 will result is a corresponding increase in the close time for piston 802 and potentially reduce the volume of the resulting click. In any case, the exact values for $E_t$ and $E_m$ vary widely with the type, age and manufacturer of the solenoid actuator and even from solenoid to solenoid of the same type.

As mentioned above, during activation an audible clicking sound results from piston 802 striking core 808, depicted in FIG. 3 as 308. It is apparent that the volume of the click sound is proportional to the force with which piston 802 strikes core 808, and hence the velocity of piston 802. Therefore, it is expected that louder clicks result from the full stroke movement of piston 802 within wear guide 812, and weaker, less audible clicks result from less than full stroke movements.

Ordinarily, and from time to time, it becomes necessary for an operator to gain access to the irrigation control valve to, for example, adjust flow control knob 120 or perform preventive maintenance on the valve itself. Often, however, cover 132 of valve box 134 will become obscured with dirt, compost, mulch, or some other obstruction 136, or by vegetation which conceals cover 132, either intentionally or unintentionally. Traditionally, an operator will attempt to locate a hidden irrigation control valve by probing the ground with a sharpened metal probe around the presumed location of the valve box and cover. Where the operator gets an indication of a hidden object below the surface, i.e., the probe makes contact with an object below the surface of the ground, the operator excavates the top soil, turf and/or shrubbery to identify the obstructing object. This method of probing and digging is an extremely time consuming process and may involve many hours to locate a hidden valve.

Often a map of the irrigation system is available from the technicians who originally installed the system that shows the layout of the pipes, sprinklers and valves for each zone, each with reference to local objects and the topography. If the operator has taken care to regularly update the map with topographical changes, such as changes in the locations of plants, shrubs, trees and other foliage, the map may provide the operator with a useful approximation of the location for each valve in the system. This is important because, as mentioned above, some irrigation controllers support 46 or more separate irrigation zones, and, larger estates, parks, golf courses and the like may utilize multiple irrigation controllers to irrigate the entire topology.

Another method for locating a hidden valve, usually less time consuming, but more expensive, is to engage the services of an irrigation service professional who employs special-purpose hardware to locate hidden valves. One device traces the underground control wires using RF (radio frequency) signals. The control wires for the affected valve(s) are disconnected or removed, or the service person taps into the control wire at some point between the valve and controller in order to establish continuity between a stand-alone RF generator and the affect valve(s). With the RF powered on, the service person tracks the RF signal emanating from the subterranean control wires using a portable RF receiver. In actuality, this method is employed for locating the control wires, which will eventually lead to the location of a hidden valve. Another method involves using a stand-alone control signal generator for rapidly activating or "chattering" the solenoid actuator. The stand-alone control signal generator can supply a modulated current to produce a rapid oscillation of the solenoid actuator. The rapid cycling produced by the modulated current results in an audible chattering sound that can guide the service person to the actual valve location. However, as with the RF generator discussed above, these units necessitate unwiring affected valve(s), removing the insulation or other methods to establish continuity between the portable device and the affected valve(s). Aside from the expense, this method suffers from another significant drawback; the prior art control signal generator does not reliably induce an audible chattering sound in valve solenoid actuators. Moreover, the service persons cannot know with any certainty whether or not the solenoid actuator is actually chattering until an exhaustive search of the grounds has been undertaken. The reason for this shortcoming can be understood from interactions between the control signal (trace 402) and the relative piston movement (trace 406), as depicted in FIG. 4.

Figure 4:
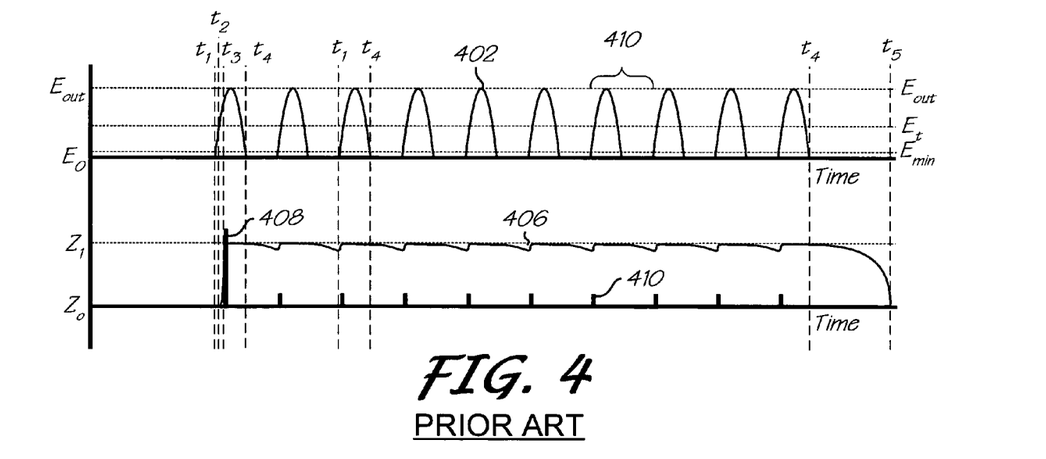
FIG. 4 is a timing diagram depicting a control signal from control signal generator and the relative position of a solenoid piston or piston movement in response to the control signal as known in the prior art.

The timing diagrams depicted in FIG. 4 are similar in many regards to those discussed above in FIG. 3. However, rather than generating a continuously full wave AV control signal as with the irrigation controller, the control signal generator produces a series of half-wave control signal 402 by clipping the portion of the 24 VAC below 0.0 VAC, resulting in a continuous 50% duty cycle pulsing of the solenoid actuator. Optimistically, that portion of duty cycle 410 which is unenergized provides sufficient time for the spring 810 to force piston 802 back into the closed position (with seat 804 sealing opening 822). However, as is apparent from relative position trace 406, the closing response time of piston 802 (between $t_4$ and $t_5$) is often far greater than half of the period of the duty cycle. Since piston 802 must have sufficient time to move away from core 808 in order to generate audible successive clicks, only a single audible click 408 results from the initial activation of the control signal generator. Any subsequent chatter produced by the solenoid actuator is a low volume hum from low amplitude clicks 410. This lower amplitude is due to the close proximity of piston 802 to core 808 at successive time $t_1$'s after the initial energizing. This method produces a less than optimum audible sound, which is the sole purpose of the device. As can be appreciated, the reason for the poor results is that the character of the control signal from the prior art signal generator is predicated on the character of the underlying input power signal and is not related, in any way, to the responsiveness of the solenoid actuator.

In accordance with one exemplary embodiment of the present invention, a chatter algorithm is integrated directly into the irrigation controller, thereby alleviating the necessity for the use of special purpose equipment. Returning to the block diagram of the irrigation controller in FIG. 2, an executable programming code for chattering an irrigation valve solenoid actuator, coupled to the control wires, is stored on programmable read only memory (ROM/PROM) 214. It is expected that the chatter algorithm, or valve locator routine, will be used infrequently and therefore, should be cost-effectively incorporated in the existing structure of irrigation controller 202 and implemented as an auxiliary diagnostic routine in controller 202. In accordance with one exemplary embodiment of the present invention, controller 202 employs plurality of discrete bidirectional switching devices 253, such as a triacs, each coupled between one of a plurality of control wire nodes 254 and a power source (not shown) for controlling actuator control current on each of control wires 140. The chatter routine provides instructions for I/O interface 248 to apply a control current to a switching device for a particular control wire. The executable programming code stored on programmable read only memory (ROM/PROM) 214 may also include a timing function to automatically terminate the chatting routine after a predetermined duration. Then again, the operator may utilize remote controller 262 for switching on and off the chatter while surveying the area or, as will be discussed below, for changing the chatter tone to help distinguish the solenoid actuator clicks over any background noise that might be present. In any event, when the diagnostic mode is activated, controller 202 will send a modulated current, via node 254, to the selected control wire that results in a rapid cycling of the solenoid actuator coupled to the selected wire. The rapid cycling produces an audible chattering sound that can be followed to the location of a hidden valve.

The presently described integrated valve locator does not require additional steps to establish continuity to the affected solenoid. Since the implementation is an integral of the electrical/firmware design of the controller, no separate unit and no establishment of continuity is required to effectuate the valve location function. This implementation is initiated by selecting this particular diagnostic mode through the standard controller user interface, which combines a dial, LCD and buttons. Alternatively, initiation of the valve locator mode could be reconfigured for one-touch operation by designating a dedicated button on the controller face panel or possibly having a dedicated dial position for the valve locator mode. Valve locator module 270, or comparable valve locator circuitry, may be integrated directly into irrigation controller 202 as a discrete component which is isolated from the digital components in irrigation controller 202. In accordance with this exemplary embodiment, valve locator module 270 should be connect directly to control wires 140 and include an separate interface for selecting a zone for testing and activating the chatter function of the module (such as buttons and/or dials).

In accordance with another exemplary embodiment of the present invention, the integrated valve locator routine described above includes a chatter algorithm that generates a control signal based on the responsiveness of the solenoid actuator and not on the character of the input signal. As mentioned elsewhere above, piston 802 responds significantly faster in the open direction than in the close direction (because the biasing force of spring 810 is relatively weak). In addition, over time spring 810 becomes weaker and the annular space between cylindrical wear guide 812 and piston 802 becomes clogged with sediment and impurities from the water, which further inhibits the movement of piston 802. Consequently, piston 802 takes even more time to move from the open position to the close position. The presently described invention compensates for the lag time of the solenoid actuator by increasing length of the duty cycle of the control signal with respect to the control pulse. The benefit of the present exemplary chatter algorithm can be appreciated through a discussion of FIG. 5.

Figure 5:
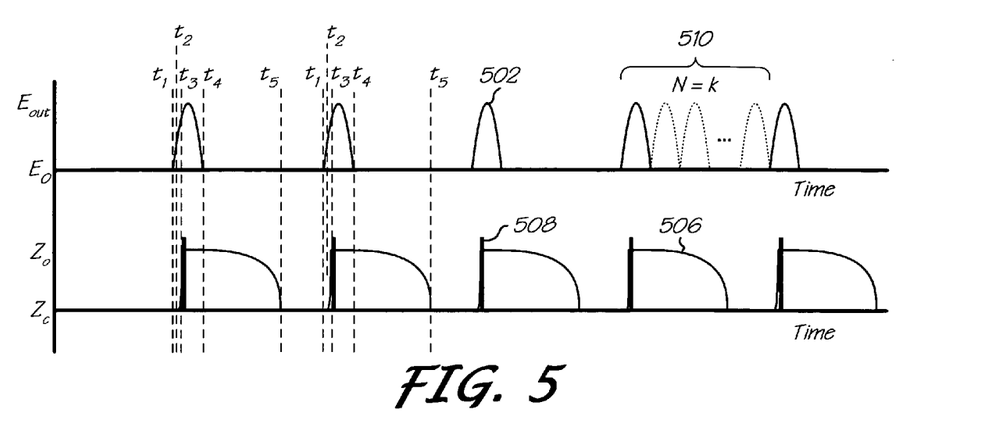
FIG. 5 is a timing diagram depicting a control signal generated by a valve locator algorithm and the relative position of a solenoid piston or piston movement in response to the control signal, for a valve locator algorithm functionally based on the responsiveness of the solenoid piston in accordance with an exemplary embodiment of the present invention.

FIG. 5 is a timing diagram depicting the interaction between a control signal (trace 502), which is controlled by a chatter algorithm, and the relative position of the piston or piston movement (trace 506), in which the algorithm is a function of the responsiveness of the solenoid piston in accordance with an exemplary embodiment of the present invention. Notice from control signal 502, that rather than merely clipping the portion of the 24 VAC control signal at 0.0 volts, as in the prior art, the present chatter algorithm modulates the control signal positive for only one half of a cycle every N cycles. Thus, the algorithm causes the irrigation controller to send one control pulse every N cycles, thereby increasing the length of the duty with respect to the control pulse. More time is provided for the piston to recover to the closed position and away from the solenoid core. In response, the solenoid actuator produces one audible click 508 for each N cycles.

In order to ensure that a click 508 will be produced for each control pulse (or each duty cycle), the algorithm holds $E_0=0.0$ volts for a longer time period than the time necessary for the solenoid piston to return to the closed position $Z_c$, or at least nearly so. Thus, N is selected such that $(N/f-|t_4-t_1|) \geq |t_5-t_4|$. This can be visualized diagrammatically in FIG. 5. There, the period of the control signal is set to NT, where $T=1/f$, (recall that f is typically 50 Hz or 60 Hz). Consequently, as illustrated by trace 502, the signal is held at $E_0$ or 0.0 volts, for at least the time period from $t_4$ to $t_5$, or for the time it takes for the piston to move from the open position, $Z_0$, to the close position, $Z_c$. It may be possible to select a value for $N_{min}$ (the minimum or threshold value for N) such that $(N_{min}/f-|t_4|-t_1|)$ is slightly shorter that $|t_5-t_4|$ during that time period piston 802 separates sufficiently from core 808 to produce an audible clicking sound. However, as a practical matter it is probably not possible to determine an absolute value for $N_{min}$ that will induce an audible chatter for all solenoid actuators, regardless of their age or physical condition, therefore the value for $N_{min}$ should include a significant safety factor.

Returning again to the diagram of controller 202 in FIG. 2, microprocessor 212 and firmware in PROM/ROM 214 control the timing of the conduction of switch 254 by supplying the appropriate control signal to the switch. The valve locator function in firmware enables switch 254 for the selected control wire output and modulates the conductivity to control wire 140 for, for example, one-half of an AC cycle every six AC half-cycles (i.e., N=3). This results in allowing a solenoid current to be applied at a 16.7% duty cycle, with a repetition period of 50 ms with 60 Hz available AC power or 60 ms with 50 Hz available AC power.

It should be appreciated that regardless of the value of N, the repeated clicking caused by 802 striking core 808, will produce an audible chatter tone as a sub-harmonic of 60 Hz (or 50 Hz). Due to constant presence of 60 Hz s a very common background signal generated by many appliances, it is often ignored by habit. This is problematic for locating hidden valves, since the chatter noise from a solenoid piston may be quite faint. Therefore, in accordance with still another exemplary embodiment of the present invention, the chatter algorithm is based on the responsiveness of the solenoid actuator and modulates the control signal to vary the tone of the chatter.

Figure 6:
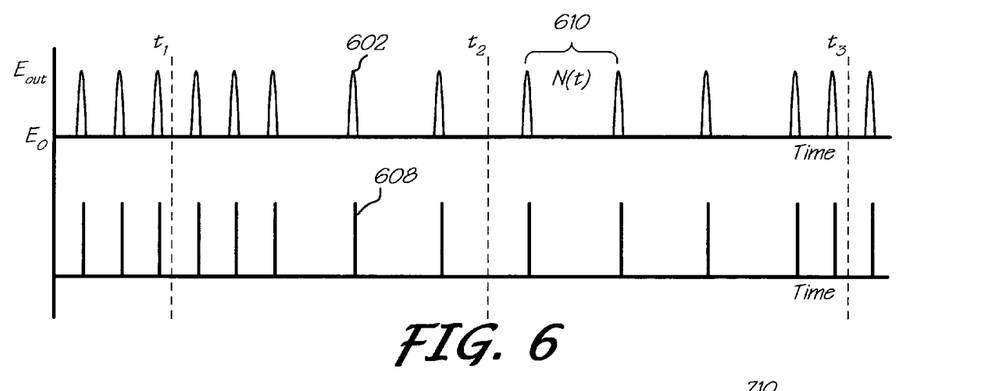
FIG. 6 is a timing diagram depicting a control signal generated by a valve locator algorithm and the relative position of a solenoid piston or piston movement in response to the control signal, for a valve locator algorithm functionally based on the responsiveness of the solenoid piston and time (i.e., N(t)) in accordance with an exemplary embodiment of the present invention.

FIG. 6 is a timing diagram depicting the interaction between the control signal (trace 602) and the relative position of the piston or piston movement (trace 606) for a chatter algorithm in which the selection of N is modulated as a function of time (i.e., N(t)), where $N(t) \geq N_{min}$. In accordance with this embodiment, the chatter algorithm is a function of the responsiveness of the solenoid actuator since $N(t) \geq N_{min}$, where $N_{min}$ is the threshold value of N at which an audible chirp will reliably be produced by the solenoid actuator. However, notice that the frequency of the duty cycle of trace 602 changes over time. That is, the period of control signal, $N_jT$, is shorter at time $t_1$ and $t_3$, and longer at time $t_2$, such that $N_{t1}T < N_{t2}T > N_{t3}T$ and $N_{t1}T \approx N_{t3}T$. The resulting chatter tone would be perceived to the operator as a higher pitch, followed by a lower pitch and then followed again by a high pitch, as illustrated by the frequency of clicks 608. Clearly, the chatter tone continues as sub-harmonics of 60 Hz, but with constantly changing pitch and therefore, easier to detect against background noise that might be present in an area. The chatter algorithm can be programmed to modulate the pitch of chatter tone in ascending sequence, a descending sequence, a ditty of pitches or even a random pitch sequence rather than producing a steady state clicking tone. Alternatively, the current signature that produces the actuator movement may be altered to maximize the volume of the chattering sound for a particular solenoid. Here, it would be particularly advantageous to employ remote controller 262 for changing the chatter tone and/or volume rather than repeatedly returning to controller 202.

Figure 7:
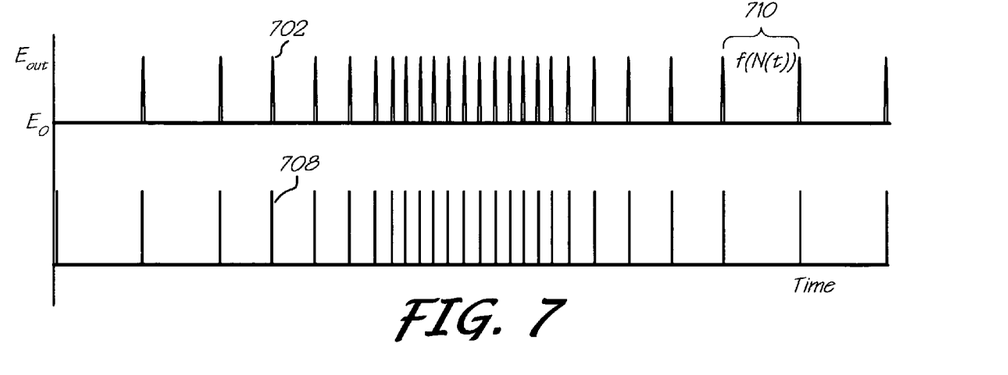
FIG. 7 is a timing diagram depicting a control signal generated by a valve locator algorithm and the relative position of a solenoid piston or piston movement in response to the control signal, for a valve locator algorithm functionally based on the responsiveness of the solenoid piston, time and an independent function (i.e., f(N(t))) in accordance with an exemplary embodiment of the present invention.

Finally, in accordance with still another exemplary embodiment of the present invention, and as depicted by the timing diagrams in FIG. 7, the chatter algorithm modulates control signal, and hence the chatter tone, by using some complex function (i.e., f(N(t))) where $f(N(t)) \geq N_{min}$. In accordance with this embodiment, the chatter algorithm is a function of the responsiveness of the solenoid actuator since $f(N(t)) \geq N_{min}$, where $N_{min}$ is the threshold value of N at which a chirp will reliably be produced by the solenoid actuator. Here, the chatter algorithm is programmed to modulate the pitch of chatter tone as a more rapid and defined sequence of pitch changes, for instance scaling. Thus, as opposed the exemplary embodiment discussed above with regard to the timing diagrams in FIG. 6, wherein the pitch changes as blocks of the tones, in accordance with the present embodiment the chatter tone may change period to period, based on a separate function, f(N(t)).

Figure 9:
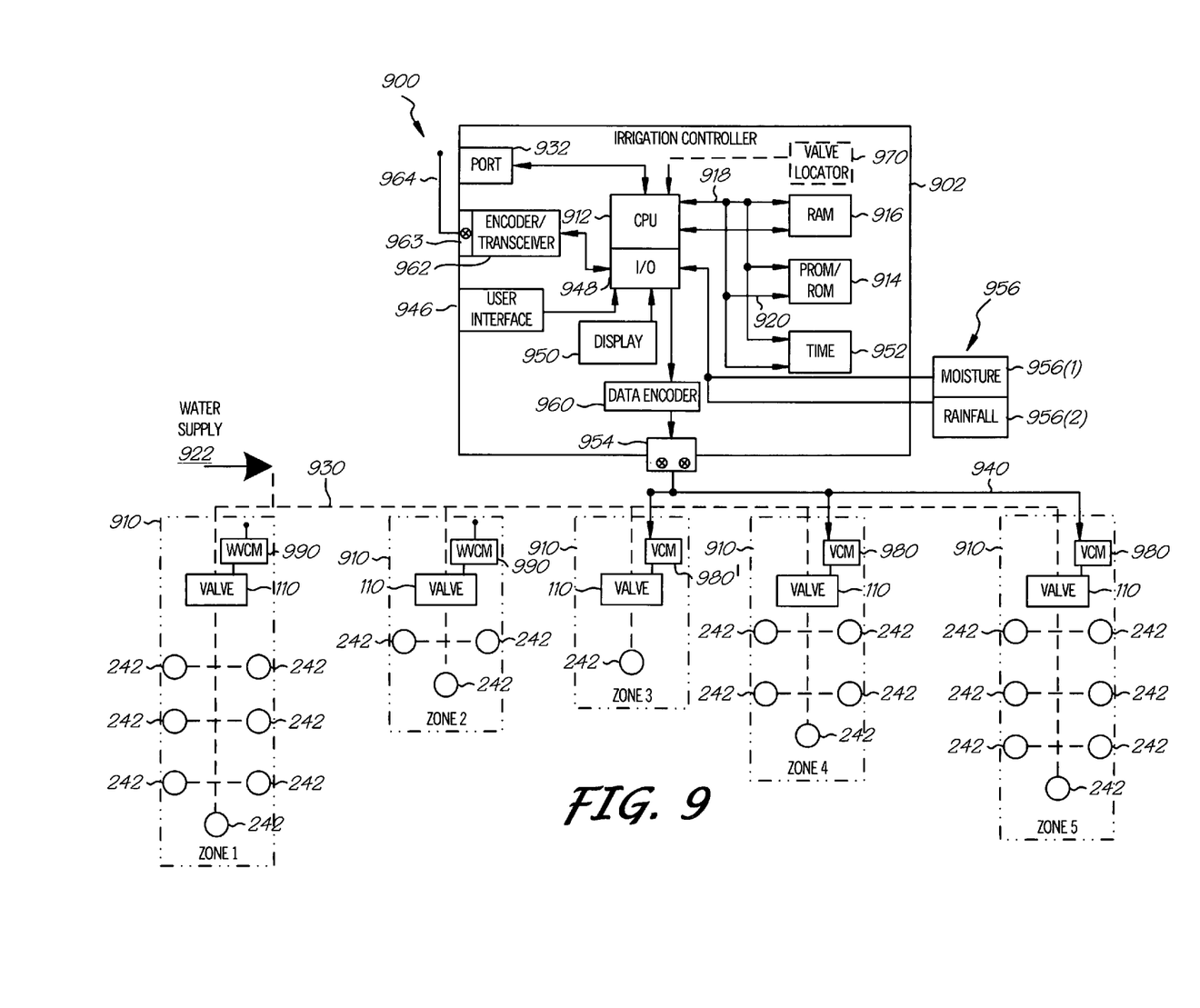
FIG. 9 is a block diagram of irrigation system 900 for transmitting control signals using a two-wire control network and a wireless network in accordance with other exemplary embodiments of the present invention.

With regard to the transmission of other types of control signals and/or transmitting control signals through other transmission mediums, FIG. 9 is a block diagram of irrigation system 900 for transmitting control signals using a two-wire control network and a wireless network in accordance with other exemplary embodiments of the present invention. Irrigation system 900 comprises irrigation controller 902 for controlling the coextensive water and electrical control networks, and valves 110 contained therein. Irrigation system 900 is similar in many respect to controller 202 described above with regard to FIG. 2, and therefore only differences in the two networks have been illustrated in FIG. 9 and will be discussed below. Irrigation controller 902 generally includes microprocessor (Main CPU) 912, programmable read only memory (ROM/PROM) 914 and random access memory (RAM) 916. Microprocessor 912 communicates with ROM/PROM 914 and RAM 916 in a conventional manner utilizing address bus 918 and data bus 920, and as should be understood that ROM/PROM 914 and RAM 916 may be incorporated within or provided separate and apart from microprocessor 912. A time of day clock 952 is also connected to microprocessor 912 through address bus 918 and data bus 920.

Communication between wired external devices is achieved using serial communications port 932, which is connected to (or is incorporated in) the microprocessor 912 to support communications between the irrigation controller 902 and external devices. Communication between most components not connected to address and data buses 918/920 and irrigation controller 902 is accomplished using I/O interface 948. For instance, communication between irrigation controller 902 and each data encoder transceiver 960 (and antenna 962), user interface 946, display 950, data encoder 970 and optional inputs from other sensors 256 such moisture sensor 956 (1) and rainfall sensor 956(2).

System 900 is depicted as having two independent electrical control networks, a wireless electrical control network for controlling of zone 1 and zone 2 and a two-wire electrical control network for controlling zones 3-5. With regard to the two-wire control network, controller 902 includes data encoder 960 coupled between I/O 948 and nodes 954 (of which only two nodes are now necessary for coupling control wires 940 to all values in the two-wire control network). Data encoder 960, under the direction of CPU 912, encodes valve addresses (along with other actuation commands and/or actuation data) for transmission on the control wires 940. Also resident on the irrigation control wires 940, with the valve address signal, is an actuation current. Generating control signals may be accomplished in a variety transmission methods, a few exemplary methods are discussed further below.

Figure 10A:
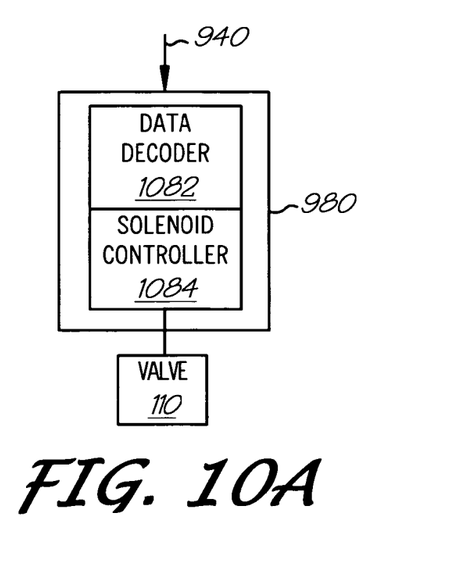
FIG. 10A is a diagram of a valve control module (VCM) in accordance with an exemplary embodiment of the present invention.

Also include in irrigation system 900 is a plurality of valve control modules 980, each is coupled between the control wires 940 and solenoid 116 of valve 110 for switching the actuation current from the control wires in response to receiving an actuation control signal from data encoder 960. FIG. 10A is a diagram of a valve control module (VCM) in accordance with an exemplary embodiment of the present invention. Located proximate to each irrigate valve 110 (on the two-wire control network) is valve control module 980 that comprises data decoder 1082 and solenoid controller 1084. Data decoder 1082 decodes incoming signals on control wire 940 and passes the decoded signal information to solenoid controller 1084 (it is expected that the processing capability resides in the solenoid controller, but alternatively the solenoid controller might merely perform the function of a switch under the direction of the a data decoder). Solenoid controller 1084 analyzes the decoded signal information for its own unique hardware address. In accordance with one embodiment, each valve control module 980, as well as the irrigation controller 902, is permanently assigned a unique hardware address (similar to a MAC (Media Access Control) address used in computer networks) that uniquely identifies each valve control module as a node of the irrigation control network. Alternatively, the hardware addresses may be manually configurable at each valve control module to suit the operator. Once solenoid controller 1084 detects its own unique hardware address in the decoded signal information, it analyzes the remainder of the decoded control signal information for other information, such as actuation control commands and actuation control data. Solenoid controller 1084 controls the control current between control wires 940 and irrigate valve 110 based on commands it receives in that information. The specific operation of each component in the VCM will vary depending on the transmission protocol imposed by on the control network.

In an analogy to the multi-wire irrigation control network discussed above with regard to FIG. 2, and accordance with one exemplary embodiment, a hardware address signal itself provides the actuation control current necessary for operating a specific irrigation valve. CPU 912 generates an actuation control signal and identifies a specific valve by the hardware address for a recipient irrigation valve, which is received by the I/O 948 and transformed into a control signal with the actuation control current by data encoder 960. This embodiment requires very little logic processing capability in VCM 980. A dumb valve control module is utilized for processing this type of control signal. The actuation control signal is simultaneously received by both the data decoder 1082 and solenoid controller 1084 in VCM 980. Data decoder 1082 decodes the control signals and passes the decoded control signal information to solenoid controller 1084. When solenoid controller 1084 recognizes its own hardware address in the decoded control signal information, it allows the actuation control signal (actually the control current) to pass through to the valve's solenoid. As mentioned above, the process capability may reside in data decoder 1082, rather than solenoid controller 1084, which would then merely direct solenoid controller 1084 to allow the actuation control signal to pass through to the valve's solenoid. In accordance with this exemplary embodiment, in irrigation mode the CPU 912 repeatedly generates actuation control signals faster than the response time of the valve, thus causing the valve to remain open. In valve locator mode, the CPU 912 generates actuation control signals in accordance with the valve locator algorithms discussed above.

While the irrigation controller 902 can simultaneously control multiple irrigation valves using the above-described transmission protocol by successively placing different addresses on control wires 940, throughput is problematic; at some point the succession of repetitious addresses overloads the irrigation control network resulting a premature valve closing. Therefore, in accordance with other embodiments the actuation control signals are implemented in a stacked or layer protocol, with the actuation control current, wherein a valve control information word or packet is formed by an address layer and a command layer. Operationally, and in accordance with this embodiment, the valve address layer provides identification information for a specific hardware address assigned to a single irrigation valve, while the actuation control layer provides actuation control commands.

For either of the three exemplary transmission modes described below, a smart valve control module is necessary to process data from control wires 940. A smart valve control module does more than recognized its own unique hardware address, it also recognizes and parses out command information and actuation data accompanying the address information, and executes the commands as a sequence of control instructions. In accordance with this embodiment, the solenoid controller unpacks the command data from the address layer, analyzes the structure of the control command(s) and then executes the command(s) in accordance with its structure. This greatly decreases the amount of information on the network and simplifies the operation of the network components.

In accordance with one exemplary transmission method, irrigation controller 902 generates a symmetrical AC wave (either a sine wave or a square wave) with a peak amplitude large enough to provide power to the valve solenoids and the associated valve control circuit—for example 20 volts peak. The period is similar to that used for prior art solenoids (50 Hz-60 Hz). At a zero time crossing, a brief period of time (approximately 1 mS) is used to encode a digital stream with traditional logic levels. This digital data consists of two components: a solenoid (valve) address and a command. VCM 980 accepts this composite signal, uses the large signal to feed its power supply, data decoder 1082 decodes the digital data from the signal and solenoid controller 1084 interprets the digital data to determine when it should pass the power along to its solenoid.

Alternatively, the digital data may be algebraically added to the main signal without special timing to place it near the zero crossing. In accordance with this exemplary embodiment, the data simply "rides on top of" the main power signal and is stripped off using a high pass filter (not shown) in VCM 980.

Finally, other transmission protocols are currently being used in two-wire control networks other than for irrigation control that may be adapted use in an irrigation control network. Of particular importance is a protocol called "Digital Command Control" (DCC), adopted and used by the National Model Railroad Association, Inc. (MRDA) as Electrical Standards For Digital Command Control, All Scales S9.1. DDC is currently used to enable independent simultaneous control of dozens of model trains on the same set of tracks. With regard to an irrigation control network, a symmetrical square wave is used to provide power, but data are embedded in the pulse width by data encoder 960. The pulse width for each pulse is either "short" or "long." Data decoder 1082 measures these pulse times and decodes them to binary values. Based on the encoded data, solenoid controller 1084 identifies its own unique hardware address in the binary values and interprets the remaining digital data to determine when it should pass the power from the square wave along to its valve's solenoid. Alternatively, other transmission modes are known and may also be may be implemented for transmitting and processing logical data for controlling irrigation valves.

With regard to any of the logical transmission modes described above, and in accordance with one exemplary embodiment, CPU 912 identifies a specific valve and generates an actuation control command(s) for the valve, which is received by the I/O 948. I/O 948 passes the information to data encoder 954 which "packetizes" the control command(s) into an address layer for transmission onto the network. In irrigation mode, the irrigation controller 902 generates actuation control "on" command as a logical ON, causing the valve to open, and subsequently separately generates and transmits an actuation control "off" command, as a logical OFF, causing the valve to close. In valve locator mode, the irrigation controller 902 generates a series of alternating ON and OFF commands in accordance with the timing of the valve locator algorithms discussed above. Alternatively, the irrigation controller 902 may instead generate a more complicated control command structure to be executed by the valve control module. For example, in irrigation mode the irrigation controller 902 may generate an ON command, followed by time interval command, and, optionally, followed by an OFF command, to be packed in an address layer of a single packet. Irrigation value control module 980 receives the data packets, identifies a valve address as its own hardware address and parses out actuation commands in the packet. For example, the message may take the form of <hardwareaddress> <messageSTART> COMMAND; COMMAND; ACTIUATIONDATA; COMMAND <messageEND>. The commands are executed in sequence, for example, executing a logical ON command by actuating the value, then tracking the time for the designated time interval command and then closing the valve, or executing a logical OFF command, if present. In valve locator mode, the logical OFF command may be followed by a second time interval command and a logical REPEATX command, instructing irrigation value control module 980 to open the valve for the first time interval, close it for the second time interval, and then repeat the sequence for X-number of repetitions.

The use of packetized data transmissions, and a unique hardware addressing scheme, facilities two-way information traffic between the respective irrigation valves and the irrigation controller via a signal encoder/decoder, which replaces address encoder 960 in irrigation controller 902. The address encoder/decoder (not specifically shown) decodes information from the respective irrigation valves, as well as encodes valve addresses and valve commands destined for the valves' electronics. Bi-directional communication is advantageous for returning an acknowledgment of a command, i.e., a logical ACK command, and for returning status after executing a series of commands, i.e., logical READY command. To further facilitate bi-directional data transmissions the valve control module may also comprises a valve status sensor and/or other appliances (not shown) for monitoring valve functions and a signal encoder/decoder (rather than an address decoder) for encoding valve function information for delivery to the irrigation controller, as well as decoding valve addresses and command information.

With regard to a wireless embodiment, the irrigation controller 902 acts as a wireless access point for transmitting (and potentially receiving) radio frequency signals for controlling (and potentially monitoring) the respective irrigation valves.

Referring again to controller 902 illustrated in FIG. 9, coupled to the I/O 948 is encoder/transceiver 962 and is further coupled to antenna 964 through node 963. Encoder/transceiver 962 receives control signal command inputs from the I/O 948 and encodes the commands as irrigation value addresses before transforming the addresses, and other data, as electromagnetic signals (typically in the radio frequency range) for transmission on antenna 964. In operation, the irrigation controller 902 can generate an address command or a more complicated layered message in which an actuation control command is packaged within an address layer, identical to the two-wire embodiment described above. Optionally, the wireless network may operate in uni-or bidirectional modes as also discussed above with regard to the two-wire embodiment. The use of packetized data transmissions enables two-way information traffic between the respective irrigation valves and the irrigation controller via a signal encoder/decoder transceiver (rather than an address encoder transceiver) for decoding information from the respective irrigation valves, as well as encoding hardware addresses and actuation control commands.

Figure 10B:
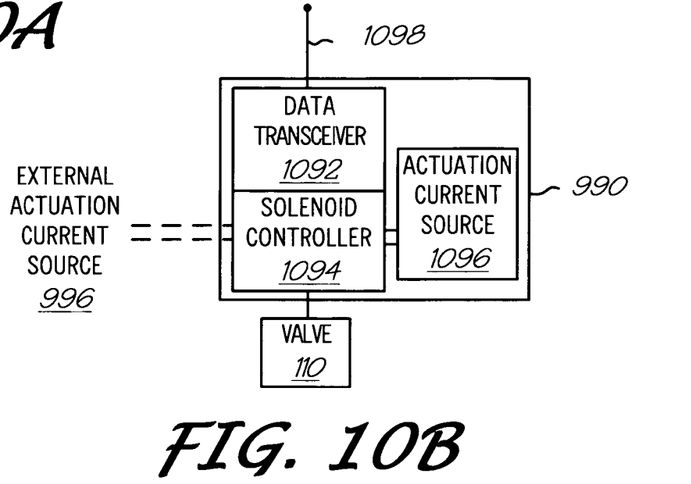
FIG. 10B is a diagram of a wireless valve control module (WVCM) in accordance with an exemplary embodiment of the present invention.

Also, in accordance with the present wireless embodiment, each valve now also becomes a wireless access point. FIG. 10B is a diagram of a wireless valve control module (WVCM) in accordance with an exemplary embodiment of the present invention. Located proximate to each valve 110 in the wireless network is wireless valve control module 990. WVCM 990 generally comprises solenoid controller 1094 coupled to actuation current source 1096 and also coupled to data decoder/transceiver 1092, which is connected to antenna 1098. Antenna 1098 intercepts an electromagnetic waves (typically in the radio frequency range) which are then received by data decoder/transceiver 1098. The decoder function attempt to decipher any signals in the airwaves, and decode the signals into actuation control signal information for processing by solenoid controller 1094. Solenoid controller 1094 analyzes the decoded control signal information for its own unique hardware address. When it recognizes its address, it continues analyzing the decoded control signal information for any other actuation commands and actuation control information that might accompany the address. In a typical message, the address is followed by one or more actuation commands, the data necessary to perform the command, such as a time limit, etc., and terminates with a logical END statement. The commands are processed into a control sequence for directing solenoid controller 1094. Alternatively, solenoid controller 1094 may be embodied as a mere switch for controlling the actuation current, with decoder/transceiver 1098 comprises electronics and logical components for processing into a control sequence. In that case, the decoded commands are executed by data decoder/transceiver 1098, which then directs the operation of solenoid controller 1094.

Actuation current source 1096 may be replaceable and/or rechargeable battery, or instead may be a separate actuation current wire coupled to a transformer (current step-down) unit remotely located at an AC outlet in relative proximity to the valve (this is more feasible for use with irrigation valve manifolds located in close proximity to wired structures). Wireless valve control module 990, in accordance with one exemplary wireless embodiment, operates similarly to valve control module 980 described above in the two-wire embodiment with the exception that the source of the actuation control current is not commingled with the control signal in the airway, but is supplied by a separate source (i.e., a battery, separate wired current source, etc.).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. For instance, although the present invention has been discussed in term of an irrigation controller, the present valve locator may be incorporated into any type of valve controller without regard to irrigation. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An irrigation controller, comprising:
    at least one control node;
    valve actuation control circuitry electrically coupled to the at least one control node for generating a valve actuation control signal on the at least one control node over an actuation period, wherein the valve actuation control signal comprises a plurality of control signal periods each having a continuous control voltage, whereby the valve actuation control signal continuously energizes the at least one control node, a control wire, and a valve coupled to the control wire over the actuation period; and
    valve chatter circuitry electrically coupled to the at least one control node for generating a valve chatter control signal on the at least one control node, wherein said valve chatter control signal comprising a plurality of duty cycles, each duty cycle comprising one control signal period and at least one naught signal period, said control signal period comprising a first voltage over a first portion of the control signal period and a second voltage over a second portion of the control signal period, and said at least one naught signal period comprising the second voltage, wherein the second voltage is less than the first voltage, whereby the valve chatter control signal intermittently energizes the at least one control node, the control wire, and the valve coupled to the control wire over the chatter period.

2. The controller recited in claim 1, wherein the continuous control voltage is one of a constant voltage and a cyclic voltage.

3. The controller recited in claim 2, wherein the valve chatter control signal further comprises one naught signal period for each control signal period.

4. The controller recited in claim 2, wherein the valve chatter circuitry for generating a valve chatter control signal further comprises circuitry for defining the duty cycle as having N periods, wherein each duty cycle comprises one control signal period and N−1 naught signal periods.

5. The controller recited in claim 4, wherein N is determined by a characteristic of the valve.

6. The controller recited in claim 4, wherein the valve chatter circuitry for generating a valve chatter control signal further comprises circuitry for defining N as a first value over a first portion of the chatter period and for redefining N as a second value over a second portion of the chatter period.

7. The controller recited in claim 4, wherein the valve chatter circuitry for generating a valve chatter control signal further comprises circuitry for using an algorithmic function for determining a value for defining N.

8. The controller recited in claim 4 further comprises:
a second control node; and
a control node selector module, wherein the valve actuation control circuitry is electrically coupled to the second node for generating the valve actuation control signal on the second control node over an actuation period, whereby the valve actuation control signal continuously energizes the second control node, a second control wire, and a second valve coupled to the control wire over the actuation period, and the valve chatter circuitry is electrically coupled to the second control node for generating the valve chatter control signal on the second control node, whereby the valve chatter control signal intermittently energizes the second one control node, the second control wire, and the second valve coupled to the second control wire over the chatter period.

9. The controller recited in claim 4 further comprises:
a valve selector module to select one of a plurality of valves coupled to the control wire, whereby the valve actuation control signal continuously energizes the at least one control node, the control wire, and a second valve of the plurality of valves coupled to the control wire over the actuation period, and whereby the valve chatter control signal intermittently energizes the at least one control node, the control wire, and the second valve coupled to the control wire over the chatter period.

10. The controller recited in claim 9 further comprises:
a memory for storing a plurality of hardware addresses associated with each of the plurality of valves, wherein the valve selector module accesses a hardware address for one of a plurality of valves from the memory and transmits the hardware address to the at least one control node.

11. An irrigation controller, comprising:
a control node;
a memory for storing processor usable program code for generating a valve control signal for energizing the control node; and
a processing unit connected to the memory and receptive of the program code, wherein the program code for generating a valve control signal, when executed by said processing unit, causes the irrigation controller to:
generate a valve actuation control signal on the control node for controlling a continuous control voltage to a valve over an actuation period; and
generate a valve chatter control signal on the control node for a controlling an intermittent chatter voltage to the valve over a chatter period, wherein the intermittent chatter voltage comprises a plurality of duty cycles and each duty cycle comprises one signal voltage period and at least one naught voltage period, said signal voltage period comprises a first voltage level over a first portion of the signal voltage period and a second voltage level over a second portion of the signal voltage period, and said at least one naught voltage period comprises a second voltage level, wherein the second voltage level is less than the first voltage level.

12. The controller recited in claim 11, wherein the continuous control voltage is one of a constant voltage level and a cyclic voltage level.

13. The controller recited in claim 12, wherein the intermittent chatter voltage comprises one naught voltage period for each control voltage period.

14. The controller recited in claim 12, wherein the duty cycle of the intermittent chatter voltage comprises N periods, wherein each duty cycle comprises one control voltage period and N−1 naught voltage periods.

15. The controller recited in claim 14, wherein a value for N is based on a characteristic of the valve.

16. The controller recited in claim 14, wherein the program code for generating the valve control signal further causes the irrigation controller to select a second valve, whereby the valve actuation control signal on the control node controls a continuous control voltage to the second valve over an actuation period and the valve chatter control signal on the control node controls the intermittent chatter voltage to the second valve over a chatter period.

17. The controller recited in claim 14, wherein the program code for generating valve control signal further causes the irrigation controller to define N as a first value for a first portion of the chatter period and as a second value for a second portion of the chatter period.

18. The controller recited in claim 14, wherein the program code for generating valve control signal further causes the irrigation controller to determine a value for N with an algorithmic function.

19. The controller recited in claim 16, wherein the memory stores a plurality of hardware addresses associated with each of a plurality of valves, wherein the program code for generating valve control signal further causes the irrigation controller to access a hardware address for one of a plurality of valves from the memory and transmits the hardware address to the control node.

20. The controller recited in claim 19, wherein the valve control signal comprises hardware address information and valve actuation information.

21. The controller recited in claim 19 above further comprises:
an antenna; and
a transmitter electrically coupled to the antenna for propagating the valve actuation control signal and the valve chatter control signal as electromagnetic signals.

22. The controller recited in claim 11, wherein the valve actuation control signal comprises a plurality of control signal periods each having a continuous control voltage, whereby the valve actuation control signal continuously energizes the control node and the valve over the actuation period, and the valve chatter control signal comprises a plurality of duty cycles, wherein each duty cycle comprising one control signal period and at least one naught signal period, said control signal period comprises the first voltage level over a first portion of the control signal period and the second voltage level over a second portion of the control signal period, and said at least one naught signal period comprises the second voltage level, whereby the valve chatter control signal intermittently energizes the control node and the valve over the chatter period.

23. The controller recited in claim 22, wherein the program code for generating valve control signal causes the irrigation controller to generate one naught signal period for each control signal period.

24. The controller recited in claim 22, wherein the program code for generating valve control signal further causes the irrigation controller to define the duty cycle as having N periods, wherein each duty cycle comprises one control signal period and N−1 naught signal periods.

25. The controller recited in claim 24, wherein a value for N is based on a characteristic of the valve.

26. The controller recited in claim 24 above further comprises:

a second control node, wherein the program code for generating valve control signal further causes the irrigation controller to:

generate the valve actuation control signal on the second control node for an actuation period, whereby the valve actuation control signal continuously energizes the second control node, a second control wire, and a second valve coupled to the second control wire for the actuation period; and generate a valve chatter control signal on the control node for a chatter period, whereby the valve chatter control signal intermittently energizes the second control node, second control wire and the second a valve coupled to the second control wire for the chatter period.

27. The controller recited in claim 26 wherein the program code for generating valve control signal further causes the irrigation controller above to select one of a plurality of valves coupled to the control wire, whereby the valve actuation control signal continuously energizes the control node, the control wire, and a second valve of the plurality of valves coupled to the control wire for the actuation period, and wherein the valve chatter circuitry is electrically coupled to the at least one control node for generating the valve chatter control signal on the at least one control node, whereby the valve chatter control signal intermittently energizes the at least one control node, the control wire, and the second valve coupled to the control wire for the chatter period.

28. The controller recited in claim 24, wherein the program code for generating valve control signal further causes the irrigation controller to define N as a first value for a first portion of the chatter period and as a second value for a second portion of the chatter period.

29. The controller recited in claim 24, wherein the program code for generating valve control signal further causes the irrigation controller to determine a value for N with an algorithmic function.

30. A method for generating valve control signal for energizing a valve, comprising:

generating a valve actuation control signal on a control node for an actuation period, said valve actuation control signal comprising a plurality of control signal periods each having a continuous control voltage, whereby the valve actuation control signal continuously energizes the control node and a valve coupled to the control node for the actuation period;

discontinuing the valve actuation control signal; and generating a valve chatter control signal on the control node for a chatter period, said valve chatter control signal comprising a plurality of duty cycles, wherein each duty cycle comprising one control signal period and at least one naught signal period, said control signal period including a first voltage over a first portion of the control signal period and a second voltage over a second portion of the control signal period, and said at least one naught signal period including a second voltage over the at least one naught signal period, wherein the second voltage is less than the first voltage, whereby the valve chatter control signal intermittently energizes the second control node and a valve coupled to the second control node for the chatter period.

31. A method for generating control signal recited in claim 30 above, wherein generating a valve chatter control signal on the second control node for a chatter period further comprises generating one naught signal period for each control signal period.

32. A method for generating control signal recited in claim 30 above, wherein generating a valve chatter control signal on the second control node for a chatter period further comprises defining the duty cycle as having N periods, wherein each duty cycle comprises one control signal period and N−1 naught signal periods.

33. A method for generating control signal recited in claim 32 above, wherein N is determined by a characteristic of the valve.

34. A method for generating control signal recited in claim 32 above, wherein N has a first value for a first portion of the chatter period and a second value for a second portion of the chatter period.

35. A method for generating control signal recited in claim 32 above, wherein a value for N is determined by an algorithmic function.

* * * * *